United States Patent

[11] 3,633,578

| [72] | Inventors | Roy William Roth<br>New Canaan, Conn.;<br>Edward Friedman, Marblehead, Mass. |
|---|---|---|
| [21] | Appl. No. | 49,533 |
| [22] | Filed | June 24, 1970 |
| [45] | Patented | Jan. 11, 1972 |
| [73] | Assignee | American Cyanamid Company<br>Stamford, Conn. |

[54] METHOD OF MAINTAINING THE INTEGRITY OF BLOOD
6 Claims, No Drawings

[52] U.S. Cl. .................................................. 128/214 R,
3/1, 128/334, 128/348, 260/29.6 F
[51] Int. Cl. ....................................................... A61m 05/00
[50] Field of Search ............................................ 128/214 R,
214 Z, 334 R, 348; 3/1; 260/29.6 F

[56] References Cited
UNITED STATES PATENTS

| 3,282,875 | 11/1966 | Connolly et al. | 260/29.6 F |
|---|---|---|---|
| 3,441,142 | 4/1969 | Oja | 210/321 |
| 3,508,959 | 4/1970 | Krahnke | 117/138.8 |
| 3,511,684 | 5/1970 | Huffaker | 3/1 X |
| 3,512,183 | 5/1970 | Sharp et al. | 3/1 |
| 3,522,346 | 7/1970 | Chang | 128/214 R |
| 3,483,867 | 12/1969 | Markovitz | 128/214 R |

*Primary Examiner*—Dalton L. Truluck
*Attorney*—Frank M. Van Riet

ABSTRACT: There is provided improved physiologically acceptable articles made from various fluorocarbon polymers and a process for maintaining the normal integrity of the blood of warm-blooded animals with said articles. The physiologically acceptable articles include specific medial devices such as catheters, etc., useful in contact with blood or tissue in warm-blooded animals.

METHOD OF MAINTAINING THE INTEGRITY OF BLOOD

BACKGROUND OF THE INVENTION

As is well known in the art, plastic articles, such as tubing, threads, plates, etc., can be and are generally employed during surgical procedures. It is also known that these plastic articles are usually fabricated from polyamides, polyhaloethylene such as polytetrafluoroethylene, etc., and can be employed as a replacement or reinforcement in warm-blooded animals for a section of (1) blood vessels, (2) sutures, (3) heart valves or (4) as part replacements or reinforcements in machines or other devices for handling blood outside of the body. Most of these prior art products are not wholly satisfactory, however, since blood readily clots or precipitates on the surface of many synthetic members. The clot formation is highly dangerous and frequently fatal to the warm-blooded animal, since such precipitation causes thrombosis. In order to overcome this difficulty, it has been a common practice to administer large doses of a blood anticoagulant, such as heparin, intravenously during and/or after surgery. Unfortunately, the administration of blood anticoagulants of this type can lead to serious side effects and can retard the healing process. It is, therefore, apparent that, if a modified plastic member of any suitable shape could be provided as a surgically acceptable replacement in which the clotting or thrombosis formation is markedly lessened or substantially eliminated, such would satisfy a long felt need.

SUMMARY

It is generally theorized that polymeric materials having some degree of negatively charged substituents on their surface markedly lessen or eliminate blood clotting or thrombus formation in warm-blooded animals. These polymeric materials may have any suitable form, such as plates, discs, threads, tubings or other shapes, for use as a physiologically acceptable member which will be in contact with blood.

It has now been unexpectedly found that plastic articles such as discs, tubes, threads or strips can be formed and thereafter utilized so as to provide an improved medical device wherein blood flowing through or over such an article will not clot and thereby cause thrombosis.

DESCRIPTION OF THE INVENTION

INCLUDING PREFERRED EMBODIMENTS

According to the present invention, a suitable article is produced from a group of polymers having recurring units of the formula (I)  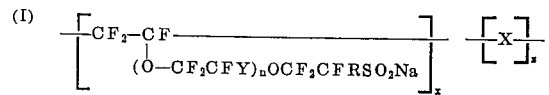

wherein R is fluorine or a perfluoroalkyl group of one-10 carbon atoms, inclusive, Y is fluorine or a trifluoromethyl group, n is an integer from 1-3, inclusive and X is the copolymerization residue of ethylene, halogenated ethylenes, perfluoro(alkyl vinyl ethers) having the formula (II) $CF_2=CF-O-(CF_2)_m-CF_3$ wherein $m$ is an integer from 0—5, inclusive, and mixtures thereof, the ratio of $x:z$ ranging from about 100:0 to about 1:99, preferably from about 1:4 to about 1:10.

These polymers are well known in the art and are more specifically disclosed in U.S. Pat. No. 3,282,875, hereby incorporated herein by reference. Said patent also discloses methods for the production of these useful polymers.

The polymers of Formula I may be produced, of course, by heating the corresponding acid copolymers, i.e., neutralizing all the acid groups by replacing them with sodium etc. This can be accomplished by any buffering technique such as contact with sodium carbonate, sodium phosphate etc. for a time sufficient to replace the acid groups, i.e., about 1 hour to about 24 hours at room temperature to 212° F., the higher the temperature, the shorter the contact time.

In general, the polymers represented by Formula I, above, are molded or otherwise fabricated, such as by extruding, solvent casting, machining etc. into a suitably shaped member before being utilized as a medical device. These polymers can be formed into such shapes or articles as discs, tubing, rings, strips, plates, rods, threads and the like. The article may be formed from the polymeric material as such or after it has been laminated, plated, coated, etc., onto a substrate member having any desired shape or form. The substrate member can be formed of any desired material such as metal, glass, cotton, silk, natural or synthetic polymers or interpolymers including polyesters, polyacids, polyacrylates, polyalcohols, polynitriles, polyamides and the like. When treated as such the final article is then acceptable for subsequent use in contact with blood in such form as a suture, i.e., a thread which comes in contact with capillary permeated tissue, as a part of a mechanical device which is in contact with blood, such as component of a heart-lung machine or as a replacement for a heart valve, artery etc. in a warm-blooded animal.

As mentioned above, we have found that these novel articles of manufacture can be utilized for maintaining the normal integrity of the blood of a warm-blooded animal. As utilized herein the term "normal integrity" means the condition of the blood as normally present in the circulatory system of the specific warm-blooded animal involved. The method of the instant invention is carried out by utilizing the article of manufacture in an environment of blood and tissues. In this manner, the articles can be utilized for such applications as containers for blood and/or living tissue inside or outside a living organism or as a device to be placed in contact with blood or living tissue inside or outside a living organism. For example, the articles can be utilized as intravenous catheters, blood bags and the blood-contacting surfaces of artificial blood vessels and other organs.

As used in our novel invention, the articles of manufacture are physiologically acceptable to warm-blooded animals. That is to say, the articles are nontoxic when implanted in or contacted with tissues in a warm-blooded animal. Furthermore, they are substantially nonthrombogenic when in contact with blood or blood components. As such, our novel prosthetic devices are medically and surgically beneficial during the course of treatment of warm-blooded animals, as prescribed by conventional medical practice.

The following examples are set forth for purposes of illustration only and are not to be construed as limitations on the present invention except as set forth in the appended claims. All parts and percentages are by weight unless otherwise specified.

EXAMPLE 1

A narrow strip of perfluorosulfonic acid copolymer having the formula

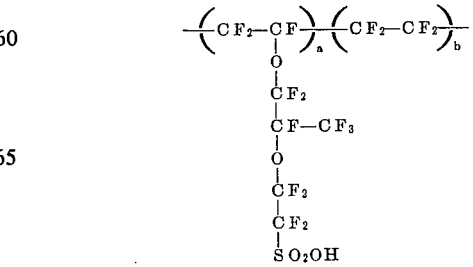

the ratio of $a:b$ being about 1:8 and the equivalent weight being about 1,200, 10 mils thick is boiled in ethyl acetate for 5 minutes to remove possible surface impurities due to handling and is then soaked 16 hours in a sodium carbonate/sodium bicarbonate buffer solution in order to convert all the sulfonic acid groups to sodium sulfonate groups. The resultant strip is rinsed in a saline solution, sterilized by standard autoclaving and surgically implanted in the jugular vein of a beagle dog. The dog remains alive and active for a period of about 3 weeks when he is sacrificed and the implanted strip is examined. The thrombus formation, thrombophlebitis and periphlebitis evidenced on the strip is considerably less in comparison with commercially available substitutes.

EXAMPLE 2

The procedure of example 1 is again followed except that the copolymer is in the shape of a catheter of 0.047 in. inside diameter and a wall thickness of 0.003 in. The catheter is checked to assure it is of neutral pH, sterilized by standard autoclaving and surgically implanted in the jugular vein of a beagle dog. The dog again remains alive and active for about 3 weeks when she is sacrificed and the implanted catheter examined. There is substantially no evidence of thrombus formation, thrombophlebitis or periphlebitis on the removed catheter.

EXAMPLE 3

The procedure of example 1 is again followed except that the copolymer has the formula

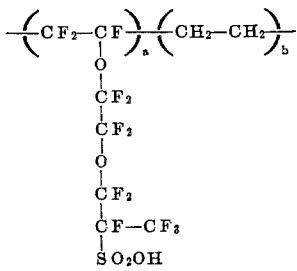

the ratio of $a:b$ being 5:1 and the copolymer is in the shape of a cannula. After the procedure of neutralization, the cannula is utilized as a conduit replacement in a heart-lung machine. After 4 weeks of use, the replacement part shows no signs of thrombus formation thereon.

EXAMPLE 4

A commercially available fluoropolymer heart valve is coated from an ethanol solution with a copolymer having the formula

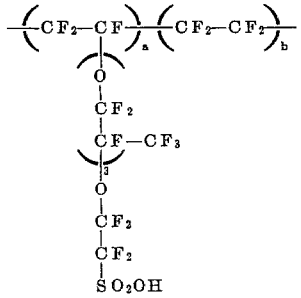

the ratio of $a:b$ being about 1:4, after sterilizing said commercial heart valve. The coated heart valve is then neutralized and sterilized as set forth in example 1 and implanted in a female beagle dog. After 4 months, the dog is alive and active and is sacrificed. The heart valve shows substantially no evidence of thrombus formation thereon.

EXAMPLE 5

The procedure of example 1 is again followed except that the copolymer has the formula

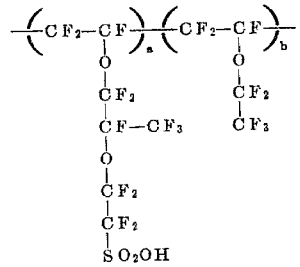

the ratio of $a:b$ being 1:20. Sheets of the copolymer are formulated into a blood bag which is then sterilized and neutralized as in example 1. Plasma from the blood of a human donor is stored in said bag for a period of 3 months at 5° C. When prepared for use, the plasma is physiologically acceptable for human use and the bag shows substantially no thrombus formation on the interior surfaces thereof.

EXAMPLE 6

The procedure of example 3 is again followed except that the prepared cannula is utilized as conduit tubing in a blood machine. Results equivalent to those of example 3 are recorded.

EXAMPLE 7

The procedure of example 1 is again followed except that the copolymer is in the shape of tubing. After neutralization and sterilization, the tubing is used as an arterial-venous bypass in a hemidialysis machine. No thrombus formation is observed in the tubing after usage of the machine for 6 months.

We claim:

1. A method for maintaining the normal integrity of the blood of a warm-blooded animal which comprises placing said blood in contact with a physiologically acceptable article produced from a polymer which as the formula

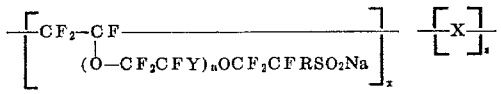

wherein R is fluorine or a perfluoroalkyl group of one—10 carbon atoms, inclusive, Y is fluorine or a trifluoromethyl group, n is a whole positive integer of 1—3, inclusive and X is the copolymerization residue of ethylene, a halogenated ethylene, a perfluoro(alkyl vinyl ether) having the formula $$CF_2\!\!=\!\!CF\!\!-\!\!O\ CF_2\ CF_3$$

wherein $m$ is a whole positive integer of from 0–5, inclusive and mixtures thereof and the ratio of $x:z$ ranges from about 100:0 to about 1:99 said polymer inherently acting to prevent the formation of thrombotic materials on the surface of the polymer thereby aiding to maintain the integrity of the contacted blood.

2. The method according to claim 1 wherein X is a halogenated ethylene.

3. The method according to claim 1 wherein the ratio of $x:z$ ranges from about 1:4 to about 1:10.

4. The method according to claim 3 wherein X is a halogenated ethylene, R is fluorine, $n$ is 1 and Y is a trifluoromethyl group.

5. The method according to claim 1 wherein $n$ is 3.

6. The method according to claim 1 wherein said blood being contacted is en vivo.

* * * * *

UNITED STATES PATENT OFFICE
CERTIFICATE OF CORRECTION

Patent No. 3,633,578    Dated January 11, 1972

Inventor(s) Roy William Roth and Edward Friedman

It is certified that error appears in the above-identified patent and that said Letters Patent are hereby corrected as shown below:

Column 1, line 28, "long felt" should read -- long-felt --; column 1, line 63, "$CF_2=CF-O-(CF_2)-CF_3$" should read -- $CF_2=CF-O-(CF_2)_m-CF_3$ --. Column 4, line 39, "as" should read -- has --; Column 4, line 52, "$CF_2=CF-O\ CF_2\ CF_3$" should read -- $CF_2=CF-O-(CF_2)_m-CF_3$ --.

Signed and sealed this 30th day of May 1972.

(SEAL)
Attest:

EDWARD M. FLETCHER, JR.
Attesting Officer

ROBERT GOTTSCHALK
Commissioner of Patents